Patented Nov. 15, 1949

2,488,500

UNITED STATES PATENT OFFICE 2,488,500

1,4-DI(ALLYLARYLOXY)-2-BUTENES

Clarence L. Moyle, Clare, Mich., assignor to The Dow Chemical Company, Midland, Mich., a corporation of Delaware No Drawing. Application September 13, 1948, Serial No. 49,134

4 Claims. (Cl. 260—613)

This invention is directed to the 1,4-di(allyl-aryloxy)-2-butenes having the formula

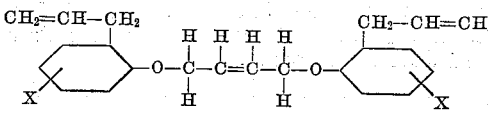

wherein X represents chlorine, phenyl, cyclohexyl or a lower alkyl radical. The new compounds are valuable as constituents of insecticide compositions and as modifying agents in plastic compositions. They are oils or crystalline solids, somewhat soluble in many organic solvents, substantially insoluble in water and non-corrosive to the skin of man and higher animals.

One method of preparing the new compounds consists of reacting 1,4-dibromo-2-butene having the formula

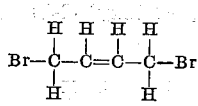

with an alkali metal salt of a 2-allylphenol further substituted in the benzene nucleus with a chlorine, phenyl, cyclohexyl or a lower alkyl radical. The reaction may be carried out in an inert organic solvent and in the presence of a small amount of water, if desired. Good yields are obtained by employing two molecular proportions of the substituted 2-allylphenolate and one molecular proportion of 1,4-dibromo-2-butene. The reaction has been found to take place at a temperature of from 30° to 100° C.

In a representative preparation, 2 mols of sodium hydroxide and 2 mols of the substituted 2-allylphenol are mixed together in methyl alcohol and a small amount of water to form a solution of the corresponding phenolate. 1 mol of 1,4-dibromo-2-butene is added portionwise to the above solution and the resulting mixture warmed for a short time at a temperature of from 40° to 80° C. to complete the reaction. The crude reaction product is then successfully washed with dilute aqueous sodium or ammonium hydroxide and water and dried over silica gel to separate the desired 1,4-di(2-allylaryloxy)-2-butene. The latter may be further purified, if desired, by recrystallization, or by extraction with a suitable organic solvent, additional washing of the solvent extract, and removal of the solvent by evaporation.

1,4-dibromo-2-butene employed as a starting material, as above described, is readily prepared by dissolving 1,3-butadiene in ethylene dichloride and reacting this solution with bromine at low temperatures. The desired product of reaction is obtained from the crude reaction mixture by conventional methods of purification, such as fractional distillation and fractional crystallization, and has a melting point of 53° C.

The following examples illustrate the invention and are not to be construed as limiting.

*Example 1.—1,4-di(2-allyl-4-chlorophenoxy)-2-butene*

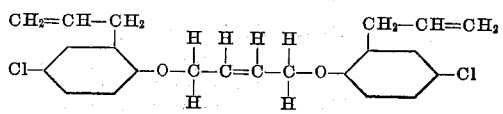

3.6 grams (0.09 mol) of sodium hydroxide and 15 grams (0.09 mol) of 2-allyl-4-chlorophenol were reacted in a mixture of 39.9 grams of methyl alcohol and 3 grams of water to form an alcoholic phenolate solution. 9.7 grams (0.045 mol) of 1,4-dibromo-2-butene was added portionwise to the above solution and the resulting mixture thereafter warmed for 15 minutes at 50° to 60° C. to complete the reaction. The crude reaction product was then dispersed in methylene dichloride and this mixture successively washed with dilute aqueous ammonium hydroxide and water, and dried over silica gel. The solvent was removed by evaporation to obtain 1,4-di(2-allyl-4-chlorophenoxy)-2-butene as a yellow oil. Upon standing this product slowly solidified to give a crystalline solid melting at 74° to 77° C.

*Example 2*

In a similar manner, 3.6 grams (0.09 mol) of sodium hydroxide, 15 grams (0.09 mol) of 2-allyl-6-chlorophenol and 9.7 grams (0.045 mol) of 1,4-dibromo-2-butene were reacted in 39.9 grams of methyl alcohol and 3 grams of water. The crude product was dispersed in dilute aqueous sodium hydroxide, the organic products of reaction extracted with methylene dichloride, and the extract washed with water and dried. The solvent was then removed by evaporation to obtain 1,4-di(2-allyl-6-chlorophenoxy)-2-butene as a yellow oil having a density of 1.17 at 25° C.

*Example 3*

3.8 grams (0.095 mol) of sodium hydroxide and 20 grams (0.095 mol) of 2-allyl-4-phenylphenol were mixed together in 24 grams of methyl alcohol and 3 grams of water. 10.2 grams (0.0475 mol) of 1,4-dibromo-2-butene was added portionwise to this alcoholic phenolate solution and the resulting mixture warmed for 15 minutes at 50° to 60° C. to complete the reaction. This product was successively washed with dilute aqueous sodium hydroxide and water, the organic products of reaction extracted with methylene dichloride, and the extract washed with water and dried. The solvent was then removed by evaporation to obtain 1,4 - di(2 - allyl - 4 - phenylphenoxy)-2-butene as a crystalline solid. The latter was recrystallized from benzene and found to have a melting point of 107° to 109° C.

*Example 4*

3.72 grams (0.093 mol) of sodium hydroxide, 20 grams (0.093 mol) of 2-allyl-6-cyclohexylphenol and 10 grams (0.0465 mol) of 1,4-dibromo-2-butene were reacted as described in Example 3 to obtain 1,4-di(2-allyl-6-cyclohexylphenoxy)-2-butene. The latter was an orange oil having a density of 1.08 at 25° C.

*Example 5*

3.72 grams (0.093 mol) of sodium hydroxide, 17.7 grams (0.093 mol) of 2-allyl-4-tertiarybutylphenol and 10 grams (0.0465 mol) of 1,4-dibromo-2-butene were reacted in accordance with the method of Example 3 to obtain 1,4-di-(2-allyl-4-tertiarybutylphenoxy)-2-butene. The latter was an orange oil having a density of 1.06 at 25° C.

In a similar manner, other 1,4-di(allylaryloxy)-2-butenes may be prepared, as follows:

1,4-di(2-allyl - 6 - secondarybutylphenoxy)-2-butene by reacting the sodium salt of 2-allyl-6-secondarybutylphenol with 1,4 - dibromo-2-butene.

1,4-di(2-allyl-4-cyclohexylphenoxy)-2 - butene by reacting the sodium salt of 2-allyl-4-cyclohexylphenol with 1,4-dibromo-2-butene.

1,4-di(2-allyl-4-methylphenoxy) - 2-butene by reacting the sodium salt of 2-allyl-4-methylphenol with 1,4-dibromo-2-butene.

1,4-di(2-allyl - 6 -phenylphenoxy)-2-butene by reacting the sodium salt of 2-allyl-6-phenylphenol with 1,4-dibromo-2-butene.

1,4-di(2-allyl-6-ethylphenoxy) - 2 - butene by reacting the sodium salt of 2-allyl-6-ethylphenol with 1,4-dibromo-2-butene.

I have found the new compounds to have insecticidal properties and adapted for inclusion in compositions to be employed for the control of agricultural and household pests. For insecticidal use, the compounds may be dispersed in a finely-divided solid and employed as a dust. Such mixture may be suspended in water with the aid of a wetting agent and the suspension applied in the form of a spray. In other procedures, the compounds may be incorporated in oils, as constituents of oil in water emulsions and in water dispersions with or without the addition of emulsifying, wetting or dispersing agents.

In representative operations, concentrates were prepared by mixing together 25 parts by weight of toxicant, 10 parts of the dioctyl ester of sodium sulfosuccinic acid (Aerosol OT) and 65 parts of xylene. The concentrates were then dispersed in water to form spray compositions containing various amounts of toxicant per 100 gallons. The following table illustrates results obtained with these sprays.

| Toxicant | Organism | Pounds of Toxicant Per 100 Gallons | Percentage Control |
|---|---|---|---|
| 1,4-di(2-allyl-4-chlorophenoxy)-2-butene | Bean aphid | 1.00 | 100 |
|  | Two-spotted spider mite | 1.00 | 78 |
| 1,4-di(2-allyl-4-tertiarybutylphenoxy)-2-butene | Two-spotted spider mite | 1.00 | 98 |
|  | Bean aphid | 0.50 | 100 |
| 1,4-di(2-allyl-6-cyclohexylphenoxy)-2-butene | Two-spotted spider mite | 3.00 | 100 |
| 1,4-di(2-allyl-4-phenylphenoxy)-2-butene | Bean aphid | 3.00 | 100 |

I claim:

1. A 1,4-di(allylaryloxy)-2-butene having the formula

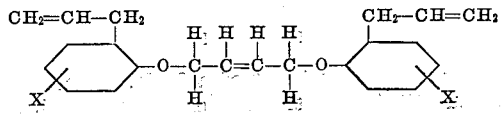

wherein X represents a member of the group consisting of chlorine, phenyl, cyclohexyl and lower alkyl radicals.

2. 1,4-di(2-allyl-4-chlorophenoxy)-2 - butene.

3. 1,4-di(2 - allyl - 4 - tertiary butylphenoxy)-2-butene.

4. 1,4-di(2-allyl-4-phenylphenoxy) - 2-butene.

CLARENCE L. MOYLE.

No references cited.